United States Patent [19]
Anderson et al.

[11] Patent Number: 6,115,422
[45] Date of Patent: Sep. 5, 2000

[54] PROTOCOL AND PROCEDURE FOR TIME BASE CHANGE IN AN MPEG-2 COMPLIANT DATASTREAM

[75] Inventors: Richard Eugene Anderson, Jericho, Vt.; Eric Michael Foster, Owego, N.Y.

[73] Assignee: International Business Machines Corporation, Armonk, N.Y.

[21] Appl. No.: 08/938,504

[22] Filed: Sep. 26, 1997

[51] Int. Cl.[7] .................................................. H04N 7/00
[52] U.S. Cl. ...................... 375/240; 370/392; 370/473; 370/394; 370/474; 370/516; 370/517; 375/357; 375/376
[58] Field of Search ........................... 375/240; 348/512, 348/465, 9, 584, 845; 370/509

[56] References Cited

U.S. PATENT DOCUMENTS

| | | | |
|---|---|---|---|
| 5,151,904 | 9/1992 | Reiner et al. ............................... | 371/43 |
| 5,365,272 | 11/1994 | Siracusa . | |
| 5,381,181 | 1/1995 | Deiss . | |
| 5,425,101 | 6/1995 | Woo et al. . | |
| 5,471,511 | 11/1995 | DeLanghe et al. ...................... | 375/376 |
| 5,502,493 | 3/1996 | Meyer . | |
| 5,506,904 | 4/1996 | Sheldrick et al. . | |
| 5,517,250 | 5/1996 | Hoogenboom et al. . | |
| 5,521,922 | 5/1996 | Fujinami et al. . | |
| 5,559,999 | 9/1996 | Maturi et al. . | |
| 5,566,089 | 10/1996 | Hoogenboom . | |
| 5,594,492 | 1/1997 | O'Callaghan et al. . | |
| 5,594,660 | 1/1997 | Sung et al. . | |
| 5,596,581 | 1/1997 | Saeijs et al. . | |
| 5,612,981 | 3/1997 | Huizer . | |
| 5,619,501 | 4/1997 | Tamer et al. . | |
| 5,751,721 | 5/1998 | Bloks ....................................... | 370/509 |
| 5,818,539 | 10/1998 | Naimpally et al. ...................... | 348/512 |
| 5,859,660 | 1/1999 | Perkins et al. .............................. | 348/9 |
| 5,905,732 | 5/1999 | Fimoff et al. ........................... | 370/516 |

OTHER PUBLICATIONS

IBM TDB vol. 39, No. 4, Apr. 1996 "Design Architecture for MPEG2 Transport Demultiplexor Assist" by Abdulhafiz et al.
"Digital Video: An Introduction to MPEG–2" by Haskell et al. Copyright 1997 by Chapman & Hall.
"MPEG Video Compression Standard" edited by Mitchell, et al. Copyright 1997 by Chapman and Hall.
"Digital Consumer Electronics Handbook" by Jurgen Copyright 1997 McGraw–Hill.
ISO/IEC 13818–1 "Information Technology—Generic Coding of Moving Pictures and Associated Audio: Systems" NO801 Nov. 13, 1994.

*Primary Examiner*—Chris S. Kelley
*Assistant Examiner*—Shawn S. An
*Attorney, Agent, or Firm*—Whitham, Curtis & Whitham; William H. Steinberg, Esq.

[57] ABSTRACT

A method of implementing a time base change to a time-division multiplexec bitstream, for example an MPEG-2-compatible bitstream. The time base change is in response to a Time Base Change Flag. The bitstreams have video and audio packetized elementary streams, and each of these streams has a common time base. Each of the packetized elementary streams has a packet header, and packet data. The packet headers of the packetized elementary streams each contain a Presentation Time Stamp/Decoding Time Stamp flag field, a Presentation Time Stamp field, and a Decoding Time Stamp field. A time base change is indicated by a change in the PCR. The first step in changing the Time Base is receiving a discontinuity in the bitstream. This is used to disable synchronization of the video and audio bitstreams, and to mark a data byte in the bitstream associated with the Time Base Change Flag. The time base change is carried out and an interrupt is issued when the marked data byte arrives for decoding. This interrupt re-enables synchronization of the audio and video bitstreams.

10 Claims, 7 Drawing Sheets

TIME BASE CHANGE EXAMPLE

PROTOCOL AND PROCEDURE FOR TIME BASE CHANGE IN AN MPEG-2 COMPLIANT DATASTREAM

FIELD OF THE INVENTION

This invention relates to digital delivery systems, especially for digital video and digital audio data. More particularly, the invention relates to multiplexors, networks, distribution systems, demultiplexors, and multiplexed bitstreams, and especially to bitstreams carrying a system or transport layer, and one or more data layers of compressed digital video and digital audio data. More particularly, the invention relates to managing changes in the program time base of a program carried in the bitstream. Changes in the program time base can result from the splicing of local feed, such as local commercials, or from changing from a studio based feed to a remote feed, or the like. A change in the program time base can result in a disturbing and undesirable loss of audio/video synchronization.

BACKGROUND OF THE INVENTION

Within the past decade, the advent of world-wide electronic communications systems has enhanced the way in which people can send and receive information. Moreover, the capabilities of real-time video and audio systems have greatly improved in recent years. Real-time video and audio systems require a large bandwidth. In order to provide services such as video-on-demand and videoconferencing to subscribers, an enormous amount of network bandwidth is required. In fact, network bandwidth is often the main inhibitor to the effectiveness of such systems.

In order to minimize the effects of the constraints imposed by the limited bandwidths of telecommunications networks, compression systems and standards have evolved. These standards prescribe the compression of video and audio data and the delivery of several programs and control data in a single bit stream transmitted in a bandwidth that would heretofore only accomodate one analog program.

One video and audio compression standard is the Moving Picture Experts Group ("MPEG") standard. Within the MPEG-2 standard, video compression is defined both within a given picture, i.e., spatial compression, and between pictures, i.e., temporal compression. Video compression within a picture is accomplished by conversion of the digital image from the time domain to the frequency domain by a discrete cosine transform, quantization, variable length coding, and Huffman coding. Video compression between pictures is accomplished via a process referred to as motion compensation, in which a motion vector is used to describe the translation of a set of picture elements (pels) from one picture to another. Audio compression is as defined in the standard.

The procedure for transporting the compressed bitstream from the transmitting end to the receiving end of the system, and for thereafter decompressing the bitstream at the receiving end, so that one of the many picture sequences is decompressed and may be displayed in real-time is specified in ISO 13818-1. ISO 13818-1 is the systems or transport layer portion of the MPEG-2 standard. This portion of the standard specifies packetization of audio and video elementary bitstreams into packetized elementary streams (PES), and the combinations of one or more audio and video packetized elementary streams into a single time division or packet multiplexed bitstream for transmission and the subsequent demultiplexing of the single bitstream into multiple bitstreams for decompression and display. The single time division or packet multiplexed bit stream is as shown from various architectural and logical perspectives in the FIGURES, especially FIGS. 1 to 5, where many packets make up a single bitstream.

The concept of packetization and the mechanism of packet multiplexing are shown in FIG. 1, denominated "Prior Art", where elementary streams are formed in an audio encoder, a video encoder, a source of other data, and a source of systems data. These elementary streams are packetized into packetized elementary streams, as described hereinbelow. The packetized elementary streams of audio data, and video data, and the packets of other data and systems data are packet multiplexed by the multiplexor into a system stream.

The time division or packet multiplexed bitstream is shown, for example, in FIGS. 2 and 5, both denominated "Prior Art", which gives an overview showing the time division or packet multiplexed bitstream. The bitstream is comprised of packets, as shown in FIG. 5. Each packet, as shown in FIG. 2, is, in turn, made up of a packet header, an optional adaptation field, and packet data bytes, i.e., payload.

The MPEG-2 System Layer has the basic task of facilitating the multiplexing of one or more programs made up of related audio and video bitstreams into a single bitstream for transmission through a transmission medium, and thereafter to facilitate the demultiplexing of the single bitstream into separate audio and video program bitstreams for decompression while maintaining synchronization. By a "Program" is meant a set of audio and video bitstreams having a common time base and intended to be presented simultaneously. To accomplish this, the System Layer defines the data stream syntax that provides for timing control and the synchronization and interleaving of the video and audio bitstreams. The system layer provides capability for (1) video and audio synchronization, (2) stream multiplex, (3) packet and stream identification, (4) error detection, (5) buffer management, (6) random access and program insertion, (7) private data, (8) conditional access, and (9) interoperability with other networks, such as those using asynchronous transfer mode (ATM).

An MPEG-2 bitstream is made up of a system layer and compression layers. Under the MPEG-2 Standard (ISO/IEC 13818-1) a time division or packet multiplexed bit-stream consists of two layers, (1) a compression layer, also referred to as an inner layer, a payload layer, or a data layer, and (2) a system layer, also referred to as an outer layer or a control layer. The compression layer or inner layer contains the data fed to the video and audio decoders, and defines the coded video and audio data streams, while the system layer or outer layer provides the controls for demultiplexing the interleaved compression layers, and in doing so defines the functions necessary for combining the compressed data streams. This is shown in FIG. 3, denominated "Prior Art." As there shown a bitstream of, for example, a system layer and compression layer, is the input to a system decoder. In the system decoder the system layer data is demultiplexed into the compressed audio layer, the compressed video layer, and control data. The control data is shown in FIG. 3, denominated Prior Art, as the PCR (Program Clock Recovery) data, enable data, and start up values. The compressed data is sent to the respective audio and video data buffers, and through decoder control to the respective audio and video decoders.

The system layer supports a plurality of basic functions, (1) time division or packet multiplexing and demultiplexing of the time division or packet multiplexed multiple bit-streams, (2) synchronous display of the multiple coded bit streams, (3) buffer management and control, and (4) time recovery and identification. The system layer also supports (5) random access, (6) program insertion, (7) conditional access, and (8) error tracking.

For MPEG-2, the standard specifies two types of layer coding, a program stream (PS), for relatively lossless environments, such as CD-ROMs, DVDs, and other storage media, and transport stream (TS), for lossy media, as cable television, satellite television, and the like. The transport stream (TS), shown in FIG. 2 and denominated Prior Art, consists of a stream of transport stream packets, each of which consists of 188 bytes, divided into 4 bytes of packet header, an optional adaptation field, and up to 184 bytes of the associated packet data, that is, payload. The relationship of the layering of the access units, the PES packets, and the Transport Stream (TS) packets is shown in FIG. 5, denominated Prior Art.

The transport stream (TS) is used to combine programs made up of PES-coded data with one or more independent time bases into a single stream. Note that under the MPEG-2 standard, an individual program does not have to have a unique time base, but that if it does, the time base is the same for all of the elements of the individual program.

The packetized elementary stream (PES) layer is an inner layer portion of the MPEG-2 time division or packet multiplexed stream upon which the transport or program streams are logically constructed. It provides stream specific operations, and supports the following functions: (1) a common base of conversion between program and transport streams, (2) time stamps for video and audio synchronization and associated timing, especially for associated audio and video packets making up a television channel, presentation, or program, and having a common time base, (3) stream identification for stream multiplexing and demultiplexing, and (4) such services as scrambling, VCR functions, and private data.

As shown in FIG. 5, denominated Prior Art, video and audio elementary streams (ES) must be PES-packetized before inserting into a transport stream (TS). Elementary streams (ES) are continuous. PES packets containing an elementary stream (ES) are generally of fixed lengths. Typically, video PES packets are on the order of tens of thousands of bytes, and audio PES packets are on the order of thousands of bytes. However, video PES packets can also be specified as of undefined length.

The MPEG-2 packetized elementary stream (PES) packet structure is shown in FIG. 4. To be noted is that all of the fields after the PES packet length are optional. The PES (packetized elementary stream) packet has a PES header, an optional header, and payload. The PES header has bit start code, a packet length field, a 2 bit "10" field, a scramble control field, a priority field, a data alignment field, a copy field, a PTS/DTS (Presentation Time Stamp/Decoding Time Stamp) field, a field for other flags, and a header length field.

The "Optional Header" field includes a Presentation Time Stamp field, a Decoding Time Stamp field, an elementary stream clock reference field, a elementary stream rate field, a trick mode field, a copy info field, a Prior Packetized Elementary Stream Clock Recovery field, an extension, and stuffing.

The packet start code provides packet synchronization. The stream ID field provides packet identification. Payload identification is also provided by the stream ID. The PTS/DTS flag fields and the PTS/DTS fields provide presentation synchronization. Data transfer is provided through the packet/header length, payload, and stuffing fields. The scramble control field facilitates payload descrambling, the extension/private flag fields and the private data fields provide private information transfer.

A transport stream (TS) may contain one or more independent, individual programs, such as individual television channels or television programs, where each individual program can have its own time base, and each stream making up an individual program has its own PID. Each separate individual program has one or more elementary streams (ES) generally having a common time base. To be noted, is that while not illustrated in the FIGURES, different transport streams can be combined into a single system transport stream. Elementary stream (ES) data, that is, access units (AU), are first encapsulated into packetized elementary stream (PES) packets, which are, in turn, inserted into transport stream (TS) packets, as shown in FIG. 5, denominated Prior Art.

The architecture of the transport stream (TS) packets under the MPEG-2 specifications is such that the following operations are enabled: (1) demultiplexing and retrieving elementary stream (ES) data from one program within the transport stream, (2) remultiplexing the transport stream with one or more programs into a transport stream (TS) with a single program, (3) extracting transport stream (TS) packets from different transport streams to produce another transport stream (TS) as output, (4) demultiplexing a transport stream (TS) packet into one program and converting it into a program stream (PS) containing the same program, and (5) converting a program stream (PS) into a transport stream (TS) to carry it over a lossy medium to thereafter recover a valid program stream (PS).

At the transport layer, the transport sync byte provides packet synchronization. The Packet Identification (PID) field data provides packet identification, demultiplexing, and sequence integrity data. The PID field is used to collect the packets of a stream and reconstruct the stream. The continuity counters and error indicators provide packet sequence integrity and error detection. The Payload Unit start indicator and Adaptation Control are used for payload synchronization, while the Discontinuity Indicator and Program Clock Reference (PCR) fields are used for playback synchronization. The transport scramble control field facilitates payload descrambling. Private data transfer is accomplished through the Private Data Flag and Private Data Bytes. The Data Bytes are used for private payload data transfer, and the Stuffing Bytes are used to round out a packet.

A transport stream is a collection of transport stream packets, linked by standard tables. These tables carry Program Specific Information (PSI) and are built when a transport stream is created at the multiplexor. These tables completely define the content of the stream. Two of the tables of the transport stream are the Program Association Table (PAT) and the Program Map Table (PMT).

The Program Association Table is a table of contents of the transport stream. It contains an ID that uniquely identifies the stream, a version number to allow dynamic changes of the table and the transport stream, and an association table of pairs of values. The pairs of values, PN, and PMT-PID, are the Program Number (PN) and the PID of the tables containing the program.

The Program Map Table is a complete description of all of the streams contained in a program. Each entry in the Program Map Table is related to one and only one program.

The role of the Program Map Table is to provide a mapping between packets and programs. The program map table contains a program number that identifies the program within the stream, a descriptor that can be used to carry private information about the program, the PID of the packets that contain the synchronization information, a number of pairs of values (ST, Data-PID) which, for each stream, specify the stream type (ST) and the PID of the packets containing the data of that stream or program (Data-PID).

There is also a Network Information Table used to provide a mapping between the transport streams and the network, and a Conditional Access Table that is used to specify scrambling/descrambling control and access.

In use, the tables are used to select and reconstruct a particular program. At any point in time, each program has a unique PID in the Program Map Table. The Program Map Table provides the PIDs for the selected program s audio, video, and control streams. The streams with the selected PIDs are extracted and delivered to the appropriate buffers and decoders for reconstruction and decoding.

Achieving and maintaining clock recovery and synchronization is a problem, especially with audio and video bitstreams. The MPEG-2 model assumes an end-to-end constant delay timing model in which all digital image and audio data take exactly the same amount of time to pass through the system from encoder to decoder. The system layer contains timing information that requires constant delay. The clock references are Program clock reference (PCR) and the time stamps are the Presentation Time Stamp/Decoding Time Stamp(PTS/DTS).

The decoder employs a local system clock having approximately the same 27 Megahertz frequency as the encoder. However, the decoder clock can not be allowed to free run. This is because it is highly unlikely that frequency of the decoder clock would be exactly the same as the frequency of the encoder clock.

Synchronization of the two clocks is accomplished by the Program Clock Reference (PCR) data field in the Transport Stream adaptation field. The Program Clock Reference values can be used to correct the decoder clock. Program Clock Reference, or PCR, is a 42 bit field. It is coded in two parts, a PCR Base having a 33-bit value in units of 90 kHz, and a PCR extension having a 9-bit extension in units of 27 MHz, where 27 MHz is the system clock frequency.

As a general rule, the first 33 bits of the first PCR received by the decoder initialize the counter in a clock generation, and subsequent PCR values are compared to clock values for fine adjustment. The difference between the PCR and the local clock can be used to drive a voltage controlled oscillator, or a similar device or function, for example, to speed up or slow down the local clock.

Audio and video synchronization is typically accomplished through the Presentation Time Stamp (PTS) inserted in the Packet Elementary Stream (PES) header. The Presentation Time Stamp is a 33-bit value in units of 90 kHz, where 90 kHz is the 27 MHZ system clock divided by 300. The PTS value indicates the time that the presentation unit should be presented to the user.

One timing and synchronization problem in MPEG-2 compliant systems is that changes in the program time base can occur at any time. These changes can arise from the stream itself. For example, changes in the program time base can arise from a change in feed, for example from splicing of local commercials, or from a provider switching sources. A time base change can adversely affect audio/video synchronization, which can cause buffer overflow or a user perceived artifact, especially if the time base change is not co-ordinated with the decoders. This upset in the program time base frequently can be severe enough to be readily perceptible to the viewer.

In present systems there is no direct means of relating the point at which a time base change occurs to the data being decoded. This is because a variable amount of buffered data may be awaiting decode. Specifically, it is necessary to disable synchronization in order to prevent new data from being tied to an old time base, and to thereafter re-enable synchronization, i.e., after all of the old data is removed from the system. However, this capability is not provided by the systems of the prior art.

Thus, a need exists for means to determine when synchronization should be disabled, and new data decoupled from an old time base, and when synchronization should be re-enabled, i.e., after all of the old data has passed through the system.

OBJECTS OF THE INVENTION

It is a primary object of the invention to manage changes in the program time base.

It is a further object of the invention to provide a specialized flag passed from the transport demultiplexor to the decoder indicating at which byte position in the data stream the time base change has taken place.

It is a still further object of the invention to provide means for the decoder to notify the host when all of the data from the old time base has been consumed and synchronization can be safely re-enabled.

SUMMARY OF THE INVENTION

These and other objects are achieved by the method and apparatus of our invention. For example, according to our invention, changes in the program time base are effectively managed. This is accomplished through the use of a specialized flag passed from the transport to the decoder indicating at which byte position in the data stream the time base change has taken place. The decoder uses this flag to determine when all of the data from the old time base has been consumed and synchronization can be safely re-enabled.

Thus, according to our invention there is provided a method and apparatus to determine when synchronization should be disabled, and new data decoupled from an old time base, and when synchronization should be re-enabled, i.e., after all of the old data has passed through the system.

According to one embodiment of our invention there is provided a method of implementing a time base change to a bitstream. This time base change is responsive to a System Time Base Discontinuity. The bitstream is an MPEG-2-compliant bitstream, containing all of the data fields specified therein. The time base change is indicated by updating the system time clock (STC) based upon, either a discontinuity or a host command.

The first step in implementing a Time Base Change according to the method of our invention is detecting a Program Clock Reference (PCR) discontinuity, and both storing the Program Clock Reference (PCR) in the System Time Clock (STC) and issuing a host interrupt. When video or audio data is again received the video or audio data packet is marked and loaded into a buffer. A flag is set with the first byte of video or audio data. Synchronization is automatically disabled by the decoder upon receipt of the flag, the decoder loads the Write Pointer Address, and the decoder monitors when the Read Pointer Address reaches the stored Write Pointer Address. At this point the host is interrupted in order to reenable sync.

THE FIGURES

The invention may be understood by reference to the Figures.

FIG. 1 denominated Prior Art, shows the packet multiplexing of the transport stream.

FIG. 2 denominated "Prior Art", shows a schematic view of the transport packet stream with a 188 byte packet, a 4 byte header, an optional adaptation field, and payload, the payload being present if the adaptation field is less then 184 bytes.

FIG. 3, denominated "Prior Art", is a schematic view of the MPEG-2 system structure, showing the system decoder, i.e., a multiplexor, demultiplexing the incoming bitstream into an audio compression layer for an audio buffer and decoder, a video compression layer for a video buffer and decoder, and PCR data for clock control.

FIG. 4, denominated "Prior Art", is a schematic view of the PES (packetized elementary stream) structure according to the MPEG-2 Standard, showing the PES header. The FIGURE shows the PES header broken into its separate fields, with a further breakdown of the Optional Header field, and a still further breakdown of the Extension field within the Optional Header field.

FIG. 5, denominated Prior Art (add quotation marks) shows the relationship of the layering of the access units, the PES packets, and the Transport Stream (TS) packets, with the encapsulation of elementary stream data into transport stream packets.

DETAILED DESCRIPTION OF THE INVENTION

The MPEG-2 transport bitstream is a set of time division or packet multiplexed bitstreams. Each such time division or packet multiplexed bitstream may contain a plurality of programs, that is, television channels, digital communications, or the like. Each bitstream contains a systems stream which provides systems layer functions for one or more audio and video elementary streams in the time division or packet multiplexed single stream. The single stream is as shown in FIGS. 1 to 5, denominated "Prior Art", where many packets make up the single bitstream. The single bitstream is a system layer. As shown generally in FIGS. 1 to 5, and with specificity in FIG. 2, the first level of granularity is a transport layer, made up of a 4 byte header, an optional adaptation field, and a payload (the payload is up to to 184 bytes if the adaptation field is less then 184 bytes). In turn, at the next level of granularity, each packet is made up of a packet header, and packet payload data bytes, which may be PES packets, table sections, or private data. The single bitstream is a system layer.

Figure 6:
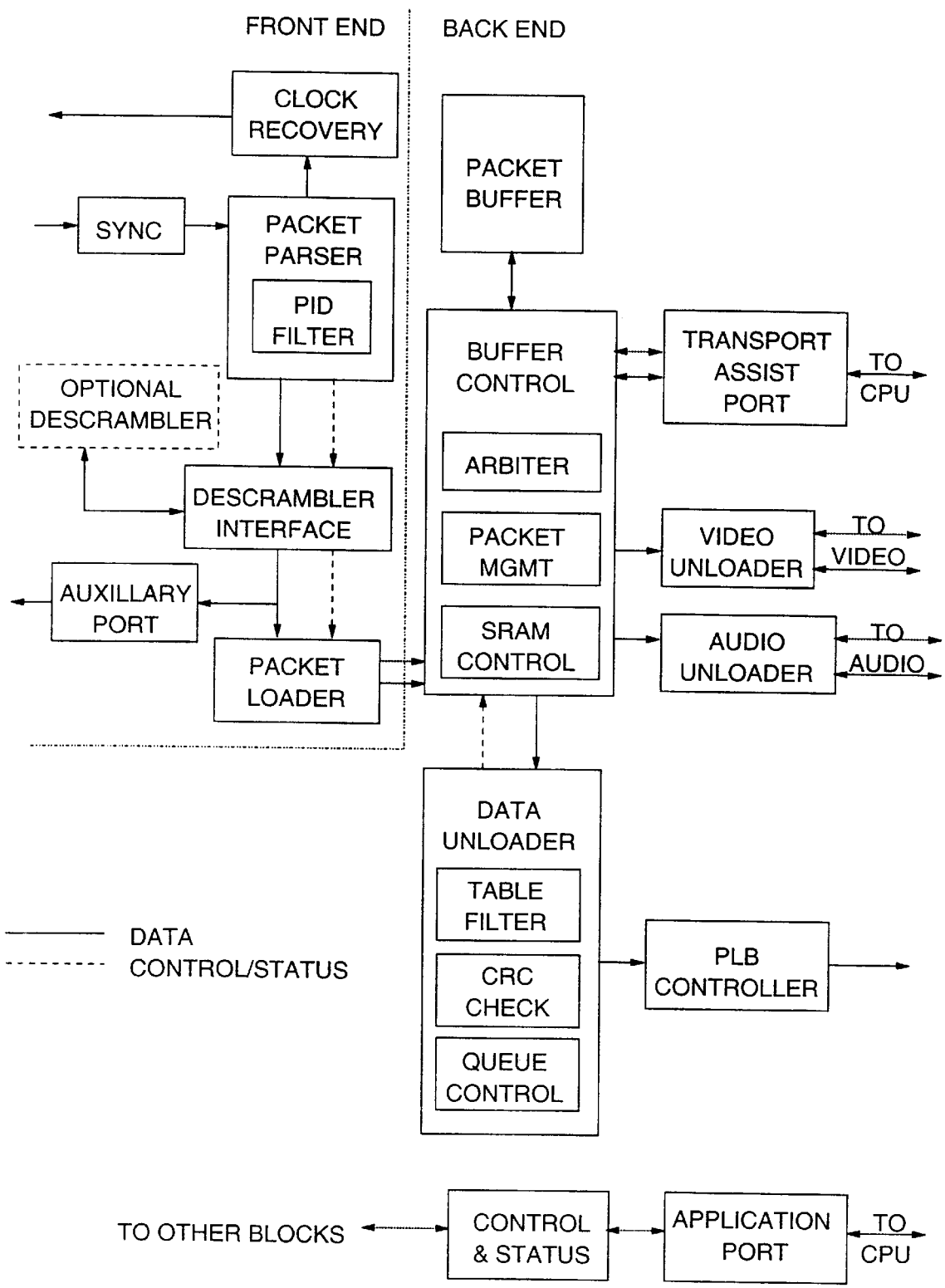
FIG. 6 shows the dataflow of the transport demultiplexor of the invention.
Figure 7:
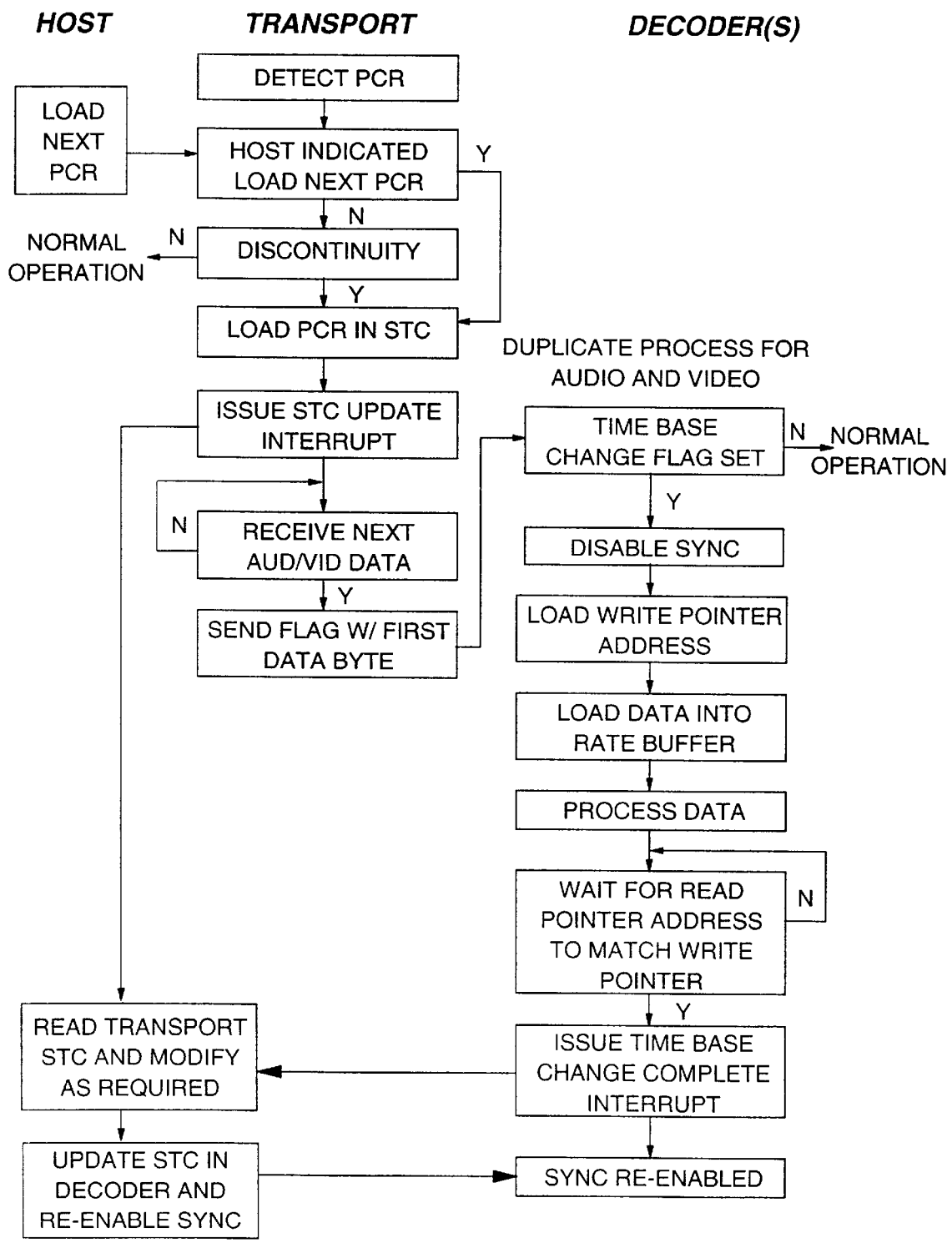
FIG. 7 shows a flow chart for the time base change method of our invention.

FIG. 6 represents the dataflow of transport stream data through the transport demultiplexor of the invention. The SYNC block determines the start of the transport packet. The PACKET PARSER extracts data from the transport packet header and adaptation field. The PID is one of these fields. The PID is compared to active PIDs in the PID filter. If the matches one of the predefined values, the remaining fields are extracted and the packet is forwarded to the descrambler interface which will send filtered but scrambled data to a descrambler, if present. The descrambler, if present, descrambles and reconstructs the packets as configured by the application. The resulting stream is optionally forwarded to an auxiliary port which provides means for other devices to obtain access to the data.

Concurrently, the packet parser sends PCRs from matching PCR packets to the clock recovery unit for reconstructing the System Time Clock (STC).

Status indicators representing parsed information are sent along with the complete transport packet to the packet loader to be stored in the packet buffer. The packet buffer holds a plurality, for example up to ten or more, transport packets while they are moved to the decoders and the DRAM or other memory. The packet buffer efficiently absorbs any latency of these data targets.

The transport core contains three unloaders, an audio unloader, a video unloader, and a data unloader. The audio unloader and the video unloader send data to the respective decoders as the data is requested. The data unloader sends data to a controller for subsequent transfer to system memory. The memory unloader can also be set up to filter table sections and perform crc checking of section data.

According to the invention the transport demultiplexor accepts either parallel or serial data, detects the synchronization character in the datastream, and establishes transport packet boundaries therefrom. In the case of serial input, where only a bit clock is provided, the transport demultiplexor of the invention establishes byte alignment.

If the transport loses synchronization and the packet buffer doesn't contain any packets for the audio and video decoders, an error is signalled to the appropriate decoder so that it can mask the error appropriately.

The status of the Sync block is reported with the InSync bit of the Status Register.

The Packet Parser extracts Transport Error Indicator information from each packet, as well as the packet boundary information, and sends it to other units to assist in their processing. Some of the parsed information is stored in the packet buffer along with the packet for use by the unloaders.

If the packet parser detects the Transport Error Indicator is set, or that the sync byte is missing and the sync drop is greater then 0, or that the TS Error Signal is active, the packet is discarded.

Figure 1:
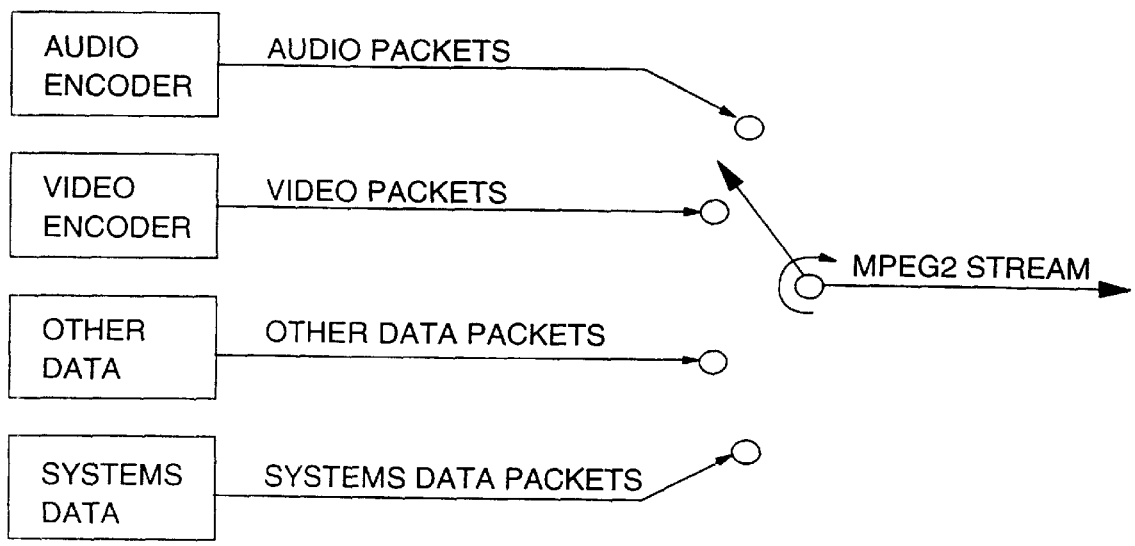
Figure 2:
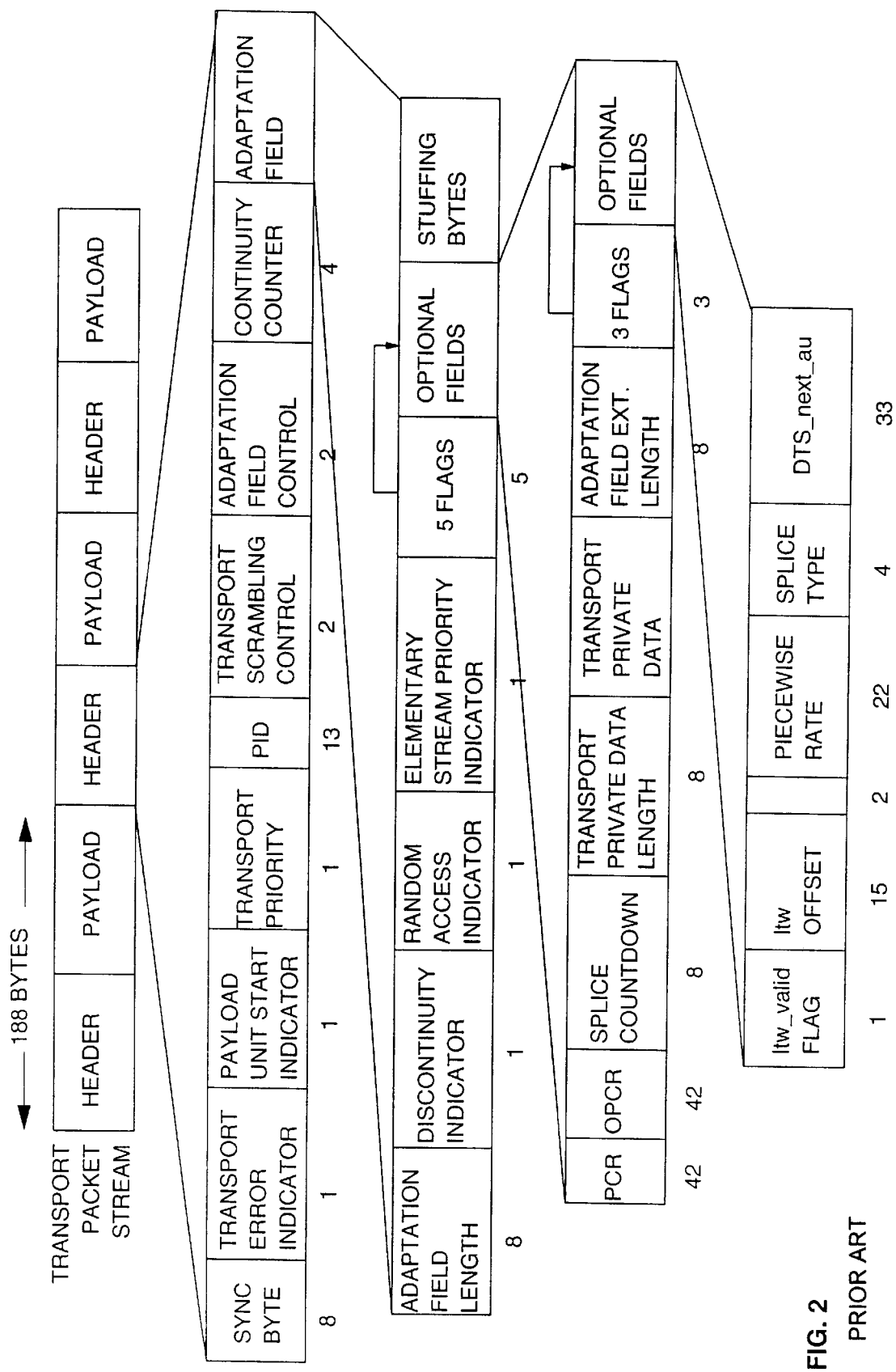
Figure 3:
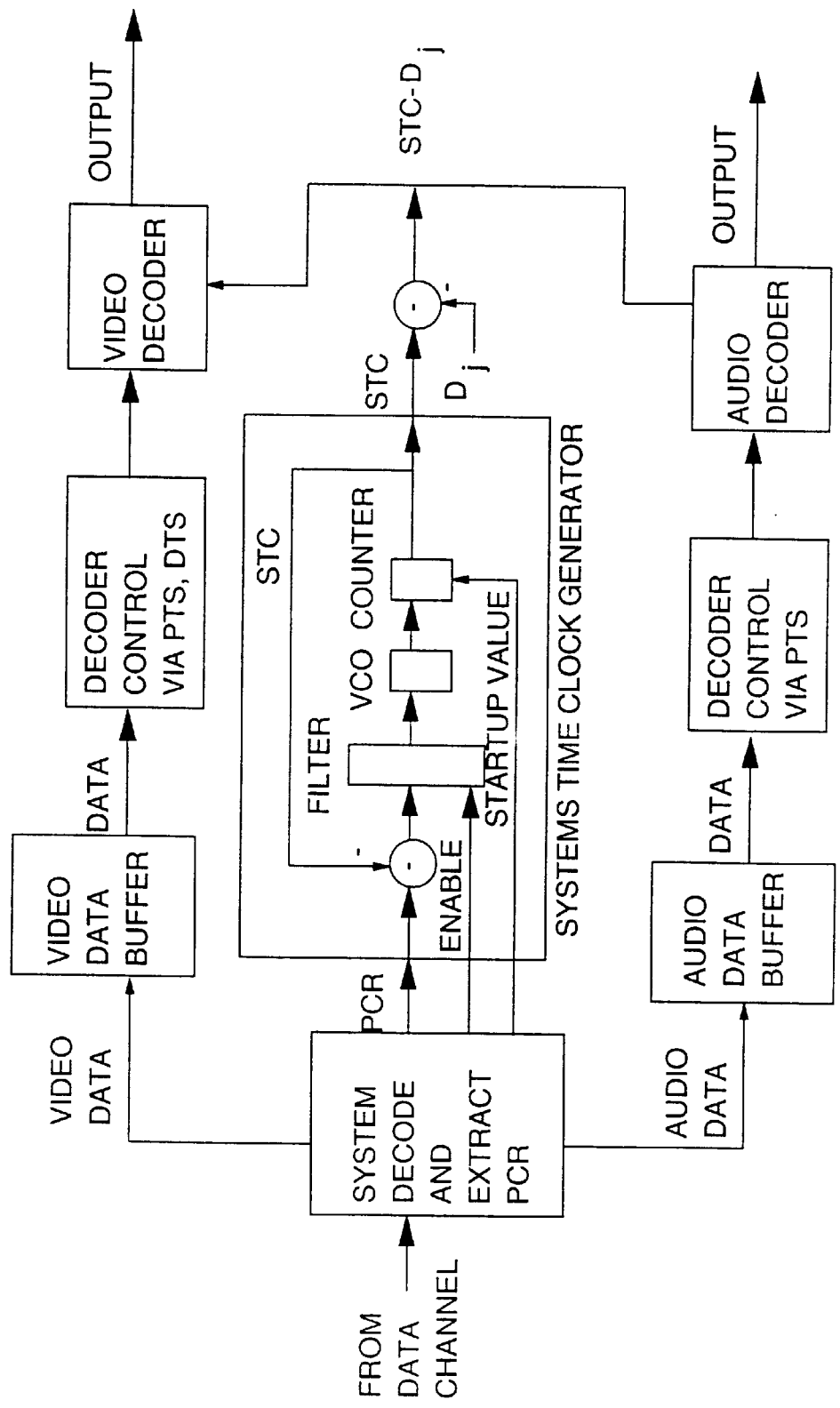
Figure 4:
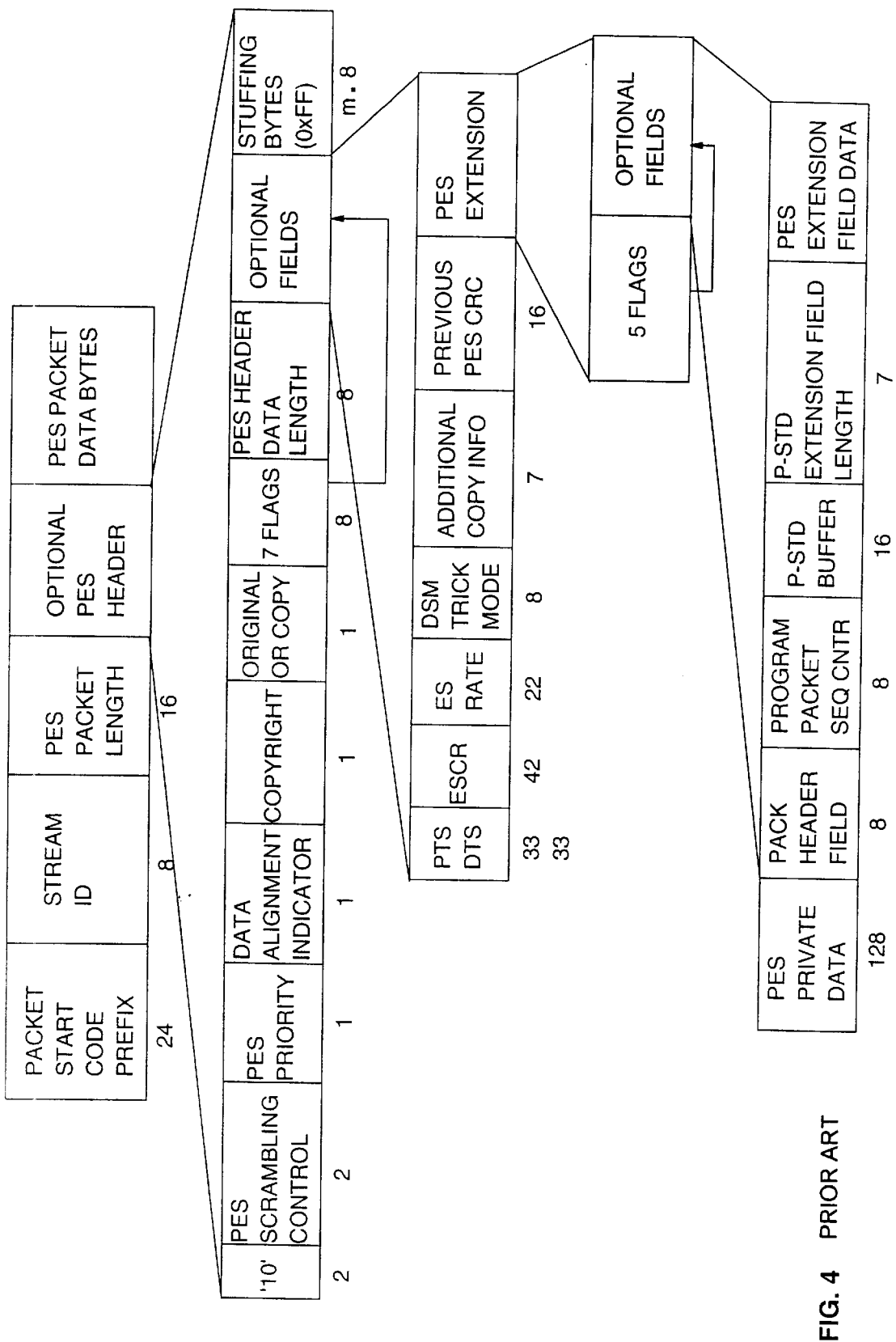
Figure 5:
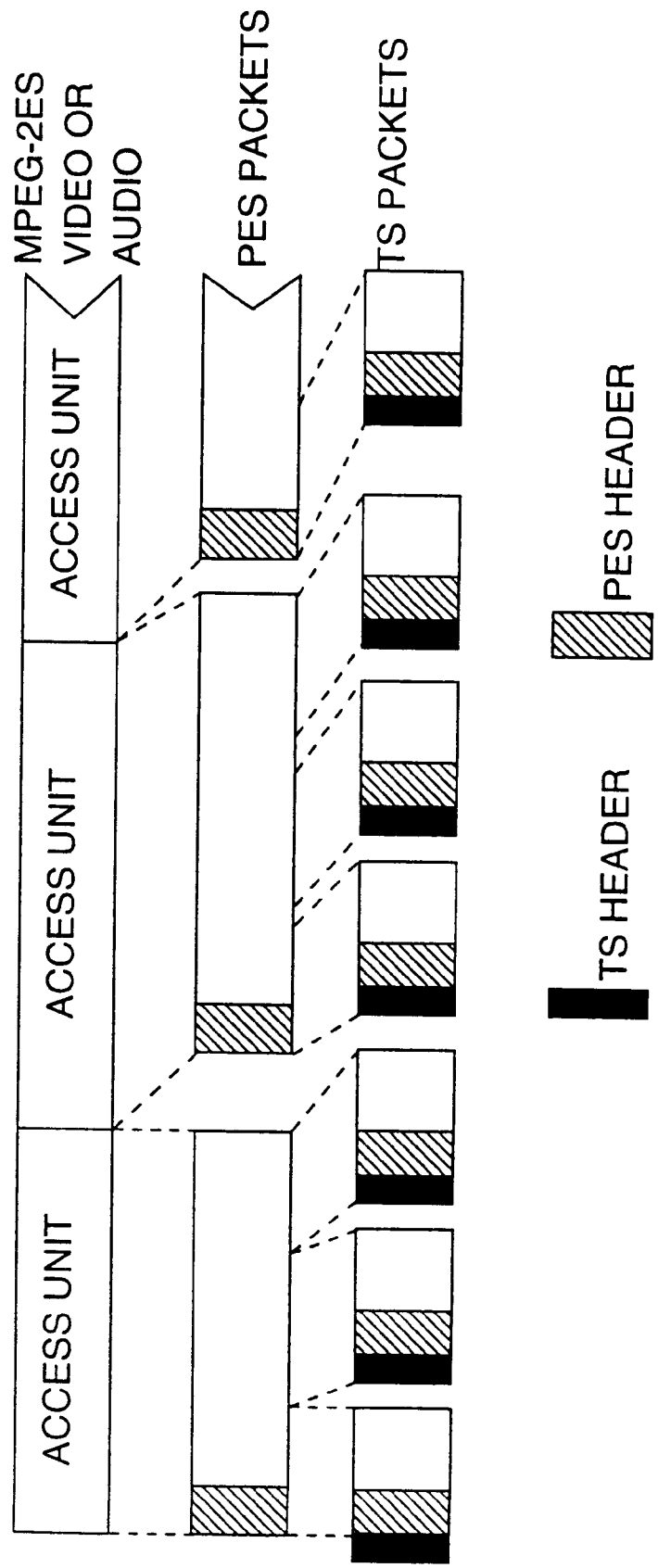

The Transport Packet Header, shown in FIG. 2 has a plurality of fields. One of the fields is a one bit Transport Error Indicator. Any packet with the Transport Error Indicator set to 1 is discarded. If the error occurred in a packet which would have matched a PID Filter entry, the continuity count check will mark the error in the next valid packet of the PID so that it can be masked by the decoders or managed by the Memory unloader. Thus, errors in packets which do not match entries in the PID Filter do not generate unnecessary events for the system to handle.

The value of the Payload Unit Start Indicator bit is forwarded to the unloaders through the packet buffer for use during packet unload to send the packetized elementary streams.

The Packet Parser incorporates a PID filter, such a 32 entry PID filter. The 13 bit PID value is sent to the PID filter to determine if a match occurs. Packets that match a PID filter entry are forwarded, while all other packets, including null packets, are discarded.

The transport demultiplexor of the invention further provides PID filtering. The PID filter registers and a corresponding PID enable register are used to control which packets are forwarded through the transport demultiplexor. A PID value should only appear once in the PID filter. There are up to 32 programmable PID values that are used to filter the transport stream. The PID filter associates a PID index, for example, a 5 bit PID index, with each of the 32 PID entries. One PID index is reserved for the video PID, and one for the audio PID. The other PID entries are defined by the application.

The front-end PID filtering logic filters incoming transport packets before they are placed in the packet buffer. Data from the PIDs, for example, data from up to about 32 different PIDs can be captured by the transport core or transport demultiplexor of the invention for delivery to the output ports. All other packets, including null packets, may be discarded.

A plurality of registers, for example, thirty two registers, are used to assign a PID index to each of the filtered packets to be delivered downstream, for example, to a descrambler and/or a decoder and/or a Packet Buffer. A PCR PID register holds the PCR PID value which can be the same or different from any of the general PID filter indices. If the PCR PID is not the same as one of the PID filter entries, then the PCR PID entries are not forwarded. Moreover, since the PCR PID filter is separate from the general PID filters, the STC can be started before the transport begins delivering data to the decoders.

When the datastream is scrambled, as would be the case for a scrambled European Telecommunications Standards Institute Digital Video Broadcasting (ETSI DVB) compliant stream, the two bit Transport Scrambling Control bits are extracted and sent to the descrambler, if present.

The two bit Adaptation Field Control Field is used to determine if an adaptation field and/or a payload is present. If an adaptation field is present, the adaptation field parsing described hereinbelow is performed. Packets with an adaptation field control value of "00" are discarded. A value of "01" indicates that there is no adaptation field, only payload. A value of "10" indicates that there is an adaptation field only, and no payload, while a value of "11" indicates that there is an adaptation field followed by payload.

The 4-bit Continuity Counter field is maintained for each enabled PID index to detect any missing data in the payload stream. The Continuity Counter is incremented on each incoming packet with a payload. This 4-bit counter wraps around to 0x0 after it reaches 0xF. The value of the continuity counter maintained by the hardware is compared to the incoming packets. If the values do not match, a PID stream error is signaled.

However, there are two situations where a PID stream error is not signaled. First, an error is not signaled if the discontinuity indicator in the adaptation field is set. In this case, the break in continuity is expected. Second, if two consecutive packets in the transport stream with the same PID have the same continuity counter value, an error is not signaled. This is because in this case one packet is a duplicate of the other. If there is no error in the first packet, the second packet is discarded. If, however, there is an error in the first packet, it is discarded and the second packet is loaded into the packet buffer.

A continuity count error is handled as a PID stream error and is forwarded to the unloaders by setting the error bit in the packet flags field stored with the packet in the packet buffer. The error can also signal an interrupt to the application processor.

The continuity field count in non-payload packets is not checked as defined by the MPEG standard. This is because the continuity count is used to insure integrity of the payload data.

The syntax of the Adaptation Field is shown in FIG. 2. Certain fields in the Adaptation Field are of special interest. For example, the Adaptation Field Length field indicates the number of byte in the adaptation field following this field. If the Adaptation Field Length Field is greater than 00, then the Adaptation Field Flags are defined. The adaptation field length is used by the unloaders to determine the start of the payload, and to deliver the Adaptation Field to the Memory queues as configured by the application processor.

The first field in the Adaptation Fields is the 1-bit Discontinuity Indicator. This flag indicates two different types of discontinuity, continuity counter and system time base. The discontinuity indicator in the PCR PID indicates a discontinuity in the system time base. The PCR, if present, is loaded into the STC. A system time base discontinuity is also signalled to the decoders on the first video or audio packet following the discontinuity. The application or host processor can be interrupted upon the arrival of a discontinuity indicator.

The next field in the Adaptation Fields is the 1-bit random access indicator. The audio and video PIDs can be configured to interrupt the host processor or assist processor upon the arrival of the random access indicator.

The PCR fields are forwarded to the Clock Recovery Unit.

The Splicing Point Flag is parsed and the host can be interrupted upon the arrival of a splicing point.

The Transport Private Data Flag can interrupt the host processor upon the arrival of private field data. Moreover, the Memory queues can be configured to forward the adaptation private data to system memory.

The transport demultiplexor can include an ETSI DVB, or other descrambler. The descrambler implements the appropriate descrambling algorithm, for example ETSI DVB. The host application and/or the transport stream can configure several control fields to control descrambling for each PID index. The Descrambling Control Fields for each PID index include "Enable", which indicates that scrambled packets of PID index are to be descrambled, "KeyID", which indicates which Control Word pair to use for the particular PID index, and "PES/TS" which indicates PES or TS level descrambling for the particular PID index. To be noted is that both PES and TS level scrambling and descrambling can be enabled, although not simultaneously for the same PID.

The control word pairs, for example, eight control word pairs, can be shared among the PIDs, for example, among 32 PIDs. A keyID, for example, a 3 bit keyID in the case of a set of 8 control word pairs, can be associated with each PID to indicate which control word pair the descrambler will use for packets of that PID. Each control word pair contains an odd key and an even key.

The descrambler, when present, maintains a constant delay, so that the descrambled data can be delivered with constant delay to an output port. The scramble control bits are modified by the descrambler for packets which are descrambled. Packets which are not configured for descrambling are sent through an aternative data path and recombined after the descrambler.

The descrambler can share resources with the transport demultiplexor. These shared resources can include the application processor interface, the Interrupt Queue register for reporting error conditions, and a logical memory array.

The descrambler reports an error when a scrambled packet is received but descrambling for that PID index is disabled; or a transport packet contains a combination of PES header and adaptation field that is not permitted under the applicable descrambling standard, such as both a PES header and an adaptation field that is not permitted by the ETSI DVB Standard; the scramble control bits are not permitted by the applicable descrambling standard, such as "01" which is not permitted under the ETSI DVB Standard; or the transport packet scramble control bits are not "00" in a PID index configured for PES packet descrambling.

These errors are reported as an interrupt to the host application. The host application can determine which type of errors have occurred by reading the descrambler status register. In a preferred exemplification of our invention, the descrambler status bits are cleared by writing the register with 1's in the corresponding bit position to be cleared allowing bits to be separately cleared.

The transport demultiplexor of the invention also supports both Transport Level and PES level descrambling. In this application the control word registers and other registers in the descrambler section of the transport demultiplexor are added to the address range of the application processor interface.

The transport demultiplexor of the invention provides a set of data processing functions. In a preferred embodiment these data processing functions do not require host processor support for handling individual packets.

The transport demultiplexor parses the individual fields in the transport header and the adaptation fields as part of the PID filtering, above, clock recovery, and error handling functions, so that PID values, error indicators, continuity counter exceptions, discontinuity indicators, and the like, can be quickly reported to the application processor.

The transport demultiplexor facilitates error handling, channel changes, and time base (STC) changes by using a compressed data connection to communicate directly with the decoders. The transport demultiplexor automatically detects and flags errors in the datastream. This allows the decoders to mask the error and recover without host system intervention. Similarly, channel changes are initiated in the transport demultiplexor with a minimum of setup, that is, changing the PID entry, and the stream changes are internally coordinated directly with each decoder, allowing fast and efficient channel switching. Changes in the time base, that is, the STC, either as part of a channel change or due to a time base discontinuity, are marked and flagged in the stream to allow the decoders to correctly synchronize updating the internal STC with respect to the data.

When a system time base change occurs in the PCR PID stream, the transport demultiplexor of our invention will automatically load the STC with the new value. The first audio and video packets with payload which arrive after the system time base change are marked. The transport demultiplexor of our invention indicates the first byte of the data following the time base change to each decoder.

Each individual decoder can monitor the appropriate time base change signal, XPT_AUD_TIME_CHANGE or XPT_VID_TIME_CHANGE, to determine when to disable sync and load the current Write Pointer Address. The host is interrupted to load the new STC and re-enable sync when the decoder s read Pointer Address equals the stored Write Pointer Address.

Changes in the program time base can desynchronize the video and audio portions of a multimedia presentation. It can take several packets of incoming data before synchronization is restored. This is readily perceptible to the viewer.

According to our invention, changes in the program time base are effectively managed. The Program Time Base data, i.e., the PCR, is in the header data of the Transport Stream (TS). At this point it should be emphasized that the input bitstream to a "set top box" contains a plurality of time division or packet multiplexed Programs. Each of these Programs includes at least one video packetized elementary stream, and audio packetized elementary stream. While each individual video and audio packetized elementary stream has its own time base data, a synchronized pair of individual video and audio packetized elementary streams have common time base data.

A packetized elementary stream has a packet start code, a packet header, and packet data, with an optional time stamp, that is independent of prior or subsequent packetized elementary streams. The packet headers of the packetized elementary streams contain a Presentation Time Stamp/Decoding Time Stamp flag field, a Presentation Time Stamp field, and a Decoding Time Stamp field. The time base change is indicated by a discontinuity in the PCR.

Effectuating the time base change, while maintaining or restoring synchronization of the video and audio is accomplished through the use of a specialized flag passed from the transport demultiplexor to the decoder indicating at which byte position in the data stream the time base change has taken place. The decoder uses this flag to disable synchronization and determine when the STC can be safely updated and sync re-enabled.

Thus, according to our invention there is provided a method and apparatus to determine when synchronization should be disabled, and new data decoupled from an old time base, and when synchronization should be re-enabled, i.e., after all of the old data has passed through the system.

According to one embodiment of our invention there is provided a method of implementing a time base change to a bitstream. This time base change is responsive to a Time Base Discontinuity Flag. The bitstream is an MPEG-2-compliant bitstream, containing all of the data fields specified therein. The time base change is indicated by a change in the PCR.

The first step in implementing a Time Base Change according to the method of our invention is receiving a time base change. A time base change can result from a time discontinuity in the stream or a host command. The next step is disabling synchronization of video and audio bitstreams, and marking a data byte in the bitstream associated with the Time Base Change Flag. The decoder uses this flag to disable sync, and mark the point in the incoming data where the time base has changed. Next, an interrupt is issued when the marked data byte arrives for decoding. This interrupt signals the host to re-enable synchronization in the audio and video decoders.

The Time Base Change Flag is active for one clock cycle. The Time Base Change flag is used to disable synchronization of the video and audio bitstreams, to mark a data byte in the bitstream associated with the Time Base Change Flag, and to set a "Time Base Change In Progress" bit in the appropriate register upon receipt of the Time Base Change flag. The time base change is carried out and an interrupt is issued when the marked data byte arrives for decoding. This interrupt signals the host to re-enable synchronization of the audio and video decoders.

Data is received by the transport demultiplexor and converted to be addressable in tabular form. Entire table sections are written to Dram or other memory including the Table ID through the last byte, where the last byte is as specified in the section length field. This capability provides the application or host processor full flexibility in interpreting the table.

One aspect of the table processing of the transport demultiplexor of the invention is table section filtering before Dram or other memory storage of the tables. Table filtering before Dram or other memory storage by the transport demultiplexor reduces the load on the application processor by filtering table sections before sending them to Dram or other memory. Filtering reduces the application processor work load for parsing table sections and the required size of working areas in Dram or other memory to manage table data.

The transport demultiplexor of the invention checks the CRC value of table sections against the value coded in the stream. Those sections that do not pass the CRC check are discarded, and the application optionally notified.

The transport demultiplexor of the invention transfers incoming packets, including portions thereof, to a system memory. This transfer is accomplished using independent queues, for example one independent queue for each PID index, that is, thirty two independent queues. Each queue can be customized, for example by the application, to adjust the size of a circular buffer and to set thresholds for interrupts and the application read pointer. For tables the application can be interrupted after a complete section has been successfully transferred into system memory.

The transport demultiplexor of our invention can support a plurality of queues in memory. According to a particularly preferred exemplification, which is MPEG-2 compatible, the transport core supports up to 32 queues in memory. Each of these queues is associated with a PID Index in the PID filter. For example, data from PID Index 5 can be stored in Memory queue 5. One Memory queue can be allocated to provide special functions.

The starting address of the Memory queue region is specified by the DRAMBase register. The DRAM region of memory is memory aligned. Each Memory queue is specified as a continuous memory region, typically allocated in 4096 byte blocks, although larger or smaller blocks may be utilized without departing from our invention, within the total Memory queue region. A single Memory queue can be configured to be as large as the entire Memory queue region.

The Memory queues can be configured to reset when a PID filter entry is written. This is accomplished by setting a corresponding bit in the DRAMRegisters register for that PID index. For example, when the DRAM Resets bit for the PID is "Not Set" and the PID filter entry is updated, any packets of this PID Index in the packet buffer are flushed. When the DRAM Resets bit for this PID is "Set" and the PID filter entry is updated, any packets of this PID Index in the packet buffer are flushed, the Memory queue is configured to be reset when the first packet of the new PID is processed, and any old interrupts in the interrupt fifo associated with this PID Index are flushed when the PID Filter entry is written.

Updates to the audio and video PID Filter registers behave the same way as updating any other entry. Performing the update as part of an audio and video channel change delays the actions described above until the Audio or Video Channel Change register is copied to the corresponding entry in the PID filter.

Moreover, the entire Dram or other memory region does not need to be allocated solely for the Memory queues. The Memory queue or queues can be placed anywhere within the Memory queue region and the remainder of the Memory queue region can be used for other purposes.

Each of the Memory queues can be configured independently, with registers specifying the start and stop addresses of each Memory queue. Preferably queue regions are non-overlapping. Memory queue memory management also includes the use of pointers or registers to determine how much data has been written to each Memory queue. One pointer or register indicates the next address within the Memory queue where data will be written, indicating the start of the current table section which is being delivered.

In the case of system data, the Memory unloader provides automatic error handling for table sections. For all types of system data the transport demultiplexor notifies the processor through an interrupt if a PID stream error occurred on data delivered to the Dram or other memory. The front-end units discard packets with errors before the error-containing packets are loaded into the packet buffer. This is because an error may make it impossible to correctly parse the packet. Additional checking is performed by the Memory unloader on table sections to ensure that the table section length matches the value in the table section header. If any type of error is found while unloading a table section, the current section is discarded and a Memory queue Write Pointer is moved back to the end of the previous valid section.

While packet buffer overflows are unlikely, should a packet buffer overflow occur, the transport demultiplexor of the invention handles the packet buffer overflow by identifying which PID streams were affected and handles the errors the same way a missing packet error is handled.

While the embodiments and exemplifications of our invention have been described and illustrated with respect to one particular standard, the MPEG-2 Standard, it is, of course to be understood the methods and apparatus of our invention can be used with other time division multiplexed and packet multiplexed data streams, having packetized headers and data, including, by way of example, the European Telecommunications Standards Institute (ETSI) Digital Video Broadcasting (DVB) standard, the High Definition Television (HDTV) standard, and the Direct Satellite System (DSS) standard, among others.

While the invention has been described with respect to certain preferred embodiments and exemplifications, it is not intended to limited to scope the invention thereby, but solely by the claims appended hereto.

We claim:

1. A method of implementing a time base change to a bitstream responsive to a time discontinuity in the bitstream while decoding the bitstream, said bitstream comprising transport packets that include both a header and a payload, where said transport packet payloads, in the aggregate, contain one or more packetized elementary streams of audio or video elementary data, a header of a said transport packet containing a discontinuity indicator indicating a change in said time base, each said packetized elementary stream includes packets having a header and a payload, a header of a packetized elementary stream periodically containing a Presentation Time Stamp indicating when a respective audio or video unit is to be presented, and wherein said time base change is indicated by the arrival of a discontinuity indicator associated with a Program Clock Reference of the time base of a corresponding packetized elementary stream, said method comprising steps of receiving a discontinuity indicator associated with a time base and generating a Time Base Change flag responsive thereto, marking a data byte in the bitstream associated with said time base change using the Time Base Change flag forming a marked data byte, queueing said bitstream, including said Time Base Change flag, for decoding by video and audio decoders, disabling synchronization of video or audio decoders, and issuing an interrupt when the said marked data stream byte arrives at said decoders for decoding, said interrupt allowing re-enabling synchronization of the video or audio decoders.

2. The method of claim 1 wherein said Time Base Change Flag is active for one clock cycle.

3. The method of claim 2 wherein said Time Base Change Flag marks the first byte of data associated with a new time base.

4. The method of claim 1 comprising disabling synchronization of video and audio bitstreams responsive to the Time Base Change flag.

5. The method of claim 1 comprising setting a "Time Base Change In Progress" bit in an appropriate register upon receipt of the Time Base Change flag.

6. A method of implementing a time base change to a bitstream responsive to a time discontinuity in the bitstream or to a host command while decoding the bitstream, said bitstream comprising transport packets that include both a header and a payload, where said transport packet payloads, in the aggregate, contain one or more packetized elementary streams of audio or video elementary data, a header of a said transport packet containing a discontinuity indicator indicating a change in said time base, each said packetized elementary stream includes packets having a header and a payload, a header of a packetized elementary stream periodically containing a Presentation Time Stamp indicating when a respective audio or video unit is to be presented, and wherein said time base change is indicated by the arrival of a discontinuity indicator associated with a Program Clock Reference of the time base of a corresponding packetized elementary stream, said method comprising steps of receiving a discontinuity indicator associated with a time base or said host command, and generating a Time Base Change flag responsive thereto, marking a data byte in the bitstream associated with said time base change using the Time Base Change flag forming a marked data byte, queueing said bitstream, including said Time Base Change flag, for decoding by video and audio decoders, disabling synchronization of video or audio decoders, and issuing an interrupt when the said marked data stream byte arrives at said decoders for decoding, said interrupt allowing re-enabling synchronization of the video or audio decoders.

7. The method of claim 6 wherein said Time Base Change Flag is active for one clock cycle.

8. The method of claim 7 wherein said Time Base Change Flag marks the first byte of data associated with a new time base.

9. The method of claim 6 comprising disabling synchronization of video and audio bitstreams responsive to the Time Base Change Flag.

10. The method of claim 6 comprising setting a "Time Base Change in Progress" bit in an appropriate register upon receipt of the Time Base Change Flag.

* * * * *